US011118428B2

(12) United States Patent
Ratulowski et al.

(10) Patent No.: US 11,118,428 B2
(45) Date of Patent: Sep. 14, 2021

(54) CONSTRUCTION OF DIGITAL REPRESENTATION OF COMPLEX COMPOSITIONAL FLUIDS

(71) Applicant: Schlumberger Technology Corporation, Sugar Land, TX (US)

(72) Inventors: John Ratulowski, Cambridge, MA (US); Denis Klemin, Houston, TX (US); Mark Andersen, Houston, TX (US); Oleg Dinariev, Moscow (RU); Nikolay Vyacheslavovich Evseev, Moscow (RU); Evgeny Ivanov, Moscow (RU); Sergey Sergeevich Safonov, Moscow (RU); Dmitry Anatolievich Koroteev, Moscow (RU)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1154 days.

(21) Appl. No.: 15/102,271

(22) PCT Filed: Nov. 25, 2014

(86) PCT No.: PCT/US2014/067462
§ 371 (c)(1),
(2) Date: Jun. 6, 2016

(87) PCT Pub. No.: WO2015/084655
PCT Pub. Date: Jun. 11, 2015

(65) Prior Publication Data
US 2016/0319640 A1      Nov. 3, 2016

Related U.S. Application Data

(60) Provisional application No. 61/911,949, filed on Dec. 4, 2013.

(51) Int. Cl.
*E21B 41/00* (2006.01)
*E21B 49/00* (2006.01)
(Continued)

(52) U.S. Cl.
CPC .......... *E21B 41/0092* (2013.01); *E21B 41/00* (2013.01); *E21B 43/20* (2013.01);
(Continued)

(58) Field of Classification Search
CPC ...... E21B 41/0092; E21B 43/20; E21B 43/26; E21B 49/00; E21B 49/02; G06F 17/5009; G06F 2217/16
(Continued)

(56) References Cited

U.S. PATENT DOCUMENTS

2009/0071239 A1    3/2009  Rojas et al.
2010/0287123 A1*  11/2010  Verma ..................... F17D 1/005
                                                                 705/500
(Continued)

FOREIGN PATENT DOCUMENTS

WO      WO2012012126 A2      1/2012

OTHER PUBLICATIONS

Walas, S.M., "Phase Equilibria in Chemical Engineering. Boston," Butterworth Publ., 1985 (109 pages).
(Continued)

*Primary Examiner* — Brian S Cook
(74) *Attorney, Agent, or Firm* — Cameron R. Sneddon (57) ABSTRACT

A method for performing a simulation of a field having a subterranean formation is described. The method includes obtaining phase behavior data of subterranean fluids of the field, generating an equation of state (EOS) model of the fluids based on the phase behavior data, generating a Helmholtz free energy model that reproduces predictions of the EOS model over a pre-determined pressure and temperature
(Continued)

range, and performing the simulation of the field using the Helmholtz free energy model. The method may further include reducing the EOS model to a reduced EOS model having a reduced number of components to represent the EOS model over a pre-determined pressure and temperature range, generating the Helmholtz free energy model based on the reduced EOS model, and obtaining and using phase behavior data of injection fluids used. A computer system data.

23 Claims, 4 Drawing Sheets

(51) Int. Cl.
  *G06F 30/20* (2020.01)
  *E21B 43/20* (2006.01)
  *E21B 43/26* (2006.01)
  *E21B 49/02* (2006.01)
  *G06F 111/10* (2020.01)

(52) U.S. Cl.
  CPC .............. *E21B 43/26* (2013.01); *E21B 49/00* (2013.01); *E21B 49/02* (2013.01); *G06F 30/20* (2020.01); *G06F 2111/10* (2020.01)

(58) Field of Classification Search
  USPC ......................................................... 703/10
  See application file for complete search history.

(56) References Cited

U.S. PATENT DOCUMENTS

| | | | |
|---|---|---|---|
| 2011/0066380 A1* | 3/2011 | Hager ................. | E21B 41/0064 702/8 |
| 2012/0150519 A1* | 6/2012 | Bang ....................... | E21B 43/16 703/10 |
| 2012/0203515 A1 | 8/2012 | Pita et al. | |
| 2012/0232859 A1 | 9/2012 | Pomerantz et al. | |

OTHER PUBLICATIONS

Reid R.C., et al., "The Properties of Gases and Liquids. New York: Mc-Graw Hill," 1987 (10 pages).
Firoozabadi, A., "Thermodynamics of Hydrocarbon Reservoirs," McGraw-Hill, 1998 (83 pages).
Demianov et al., "Introduction to the density functional method in hydrodynamics", Fizmatlit, Moscow, 2014 (4 pages).
H.B. Callen, Thermodynamics and an introduction to thermostatics, 2nd edition, John Wiley & Sons, New York, 1985 (5 pages).
Examination Report issued in the related AU application 2014357460, dated Apr. 11, 2018 (5 pages).
Dinariev, O. Yu., "A Hydrodynamic Description of a Multicomponent Multiphase Mixture in Narrow Pores and Thin Layers," J. Appl. Math. Mech. 59, No. 5, 745-752 (1995).
Dinariev, O. Yu., "Thermal Effects in the Description of a Multicomponent Mixture Using the Density Functional Method," J. Appl. Math. Mech. 62, No. 3, 397-405 (1998).
Demianov et al., "Density Functional Modelling in Multiphase Compositional Hydrodynamics", 89 Can. J. Chem. Eng., 206, 211-12 (Apr. 2011).
D. Koroteev, et al,. "Application of Digital Rock Technology for Chemical EOR Screening", SPE-165258, Kuala Lumpur, Malaysia, Jul. 2-4, 2013 (12 pages).
Sengers, Johanna Levelt, "How Fluids unmix: discoveries by the school of Van der Waals and Kamerlingh Onnes", Amsterdam: Koninklijke NederLandse Akademie van Wetenschappen, Jan. 1, 2002 (320 pages).
International Search and Written Opinion issued in the related PCT application PCT/US2014/067462, dated Mar. 27, 2015 (14 pages).
International Preliminary Report on patentability issued in the related PCT application PCT/US2014/067462, dated Jun. 7, 2016 (10 pages).
Extended Search report issued in the related EP Application 14868095. 2, dated Dec. 12, 2017 (9 pages).
Han W.S.et al., "Comparison of two different equations of state for application of carbon dioxide sequestration", Advances in Water Resources, CML Publications, Southampton, GB, vol. 31, No. 6, Jun. 1, 2008-Dec. 1, 2017, pp. 877-890.
Examination Report issued in the related AU application 2014357460, dated Mar. 5, 2019 (5 pages).

\* cited by examiner

CONSTRUCTION OF DIGITAL REPRESENTATION OF COMPLEX COMPOSITIONAL FLUIDS

CROSS-REFERENCE TO RELATED APPLICATION

The present application claims priority from U.S. Provisional Application 61/911,949, filed Dec. 4, 2013, which is incorporated herein by reference in its entirety.

BACKGROUND

Operations, such as geophysical surveying, drilling, logging, well completion, and production, are typically performed to locate and gather valuable downhole fluids. Surveys are often performed using acquisition methodologies, such as seismic mapping, or resistivity mapping, to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required to extract such fluids or minerals. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

Simulations are commonly used in the oil industry and other industries to model processes and predict behaviors. Each type of simulation is relevant to a certain scale of process. A common example in the oil industry is the use of reservoir flow models to predict dynamic behavior at the scale of a reservoir, which can be from a few meters to hundreds of meters thick and can be thousands of meters in lateral extent. The volume elements in these models are typically on the order of meters or tens of meters on a side. Reservoir scale processes, such as developed miscibility, can develop within the model.

At the other extreme, micromodels of porous media represent small pieces of the media, typically with volume elements on the order of a few microns or less on a side and full models that are on the order of millimeters or less in extent. In these models, the small size means the residence time of fluids within the model is too short for many processes to develop fully. The present disclosure is within the domain of these small models.

Static micromodels representing pore and grain geometry can be obtained in several ways at different scales. Thin sections of rocks are formed by injecting a colored epoxy into a rock and then slicing an optically thin section and mounting it onto a glass slide. This is optically analyzed to obtain images of the pores and grains. Multiple thin sections can be used to create a micromodel, typically using statistical distributions rather than making an image directly from stacked thin sections. Alternatively, a small rock volume can be scanned using X-rays in a micro computed tomography (microCT) machine. The tomographic inversion of the X-ray scans is used to create a static model of a rock with resolution ranging from tens of microns to tens of nanometers. This computed tomography (CT) image is processed and segmented into grains and pores. A third method uses ion beam milling and scanning electron microscopy to create a series of images with nanometer-scale resolution. These images can be analyzed and used to construct a static three-dimensional (3D) model of a tiny portion of the rock.

Micromodels for flow-dynamic behavior in porous media are of a few types. Pore network models substitute a complex network of nodes and connectors to represent the pores and pore throats, respectively. The network is based on a static representation rock model, and flow dynamics are applied to the pore network. Lattice Boltzmann models are based on movement of particles on a three-dimensional grid, which can be placed within a static rock model. A third method uses microhydrodynamical modeling in a static rock model to represent simple or complex fluid-fluid and fluid-rock interactions during flow or while a chemical process develops.

The density functional theory for the compositional multiphase hydrodynamics has been disclosed in Dinariev, O. Yu., "A Hydrodynamic Description of a Multicomponent Multiphase Mixture in Narrow Pores and Thin Layers," Journal of Applied Mathematics and Mechanics 59, No. 5, 745-752 (1995) and Dinariev, O. Yu., "Thermal Effects in the Description of a Multicomponent Mixture Using the Density Functional Method," Journal of Applied Mathematics and Mechanics 62, No. 3, 397-405 (1998). In particular, isothermal theory based on the Helmholtz energy functional is disclosed in Dinariev, 1995, and nonisothermal theory based on entropy functional is disclosed in Dinariev, 1998. The up to date review of the density functional theory in compositional hydrodynamics and its applications can be found in Demianov et al., "Introduction to the density functional method in hydrodynamics", Fizmatlit, Moscow, 2014. ISBN 978-5-9221-1539-1. The Helmholtz energy functional, which is also known as the Helmholtz free energy functional, is more convenient for practical applications than the entropy functional, because: a) a range of isothermal problems is wide, and b) in case of variable temperature the entropy functional can be easily derived from the Helmholtz energy functional.

At present, the mainstream approach in thermodynamics of multiphase fluid systems is based on the equation of state (EOS) approach described in Walas, S. M., "Phase Equilibria in Chemical Engineering", Boston, Butterworth Publ., 1985; Reid R. C., et al., "The Properties of Gases and Liquids", New York: Mc-Graw Hill, 1987, and Firoozabadi, A., "Thermodynamics of Hydrocarbon Reservoirs", McGraw-Hill, 1998. In the EOS workflow, a certain semi-empirical expression for pressure is postulated, while the existing free parameters are used to obtain the fit with experiment. Then relevant thermodynamic potentials can be reconstructed from the EOS with the use of additional information.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The subject matter of the present application includes a method for performing a simulation of a field having a subterranean formation. The method includes obtaining phase behavior data of subterranean fluids of the field, generating an equation of state (EOS) model of the fluids based on the phase behavior data, generating a Helmholtz free energy model that reproduces predictions of the EOS model over a pre-determined pressure and temperature range, and performing the simulation of the field using the Helmholtz free energy model. The method may further include reducing the EOS model to a reduced EOS model having a reduced number of components to represent the EOS model over a pre-determined pressure and temperature range, generating the Helmholtz free energy model based on the reduced EOS model.

The present application further describes a computer system including a processor and memory having a reservoir production (RP) tool stored in the memory. The RP tool executes on the processor and includes an input module configured to obtain phase behavior data of fluids, an EOS model generator configured to generate an EOS model of the fluids based on the phase behavior data, a free energy model generator configured to generate a Helmholtz free energy model that reproduces predictions of the EOS model over a pre-determined temperature and pressure range, and a simulator configured to perform simulation of the field using the Helmholtz free energy model. The computer system further includes a repository configured to store the phase behavior data, the EOS model, and the Helmholtz free energy model.

In a further embodiment the present application describes a method for performing a simulation of a field having a subterranean formation, the method including obtaining phase behavior data of subterranean fluids of the field, obtaining phase behavior data of injection fluids used in the field, generating a Helmholtz free energy model that reproduces the phase behavior data of the fluids of the field over a pre-determined pressure and temperature range, and performing the simulation of the field using the Helmholtz free energy model.

BRIEF DESCRIPTION OF THE DRAWINGS

The appended drawings illustrate several embodiments of construction of Helmholtz free energy or entropy functional describing thermodynamics of complex compositional fluids and are not to be considered limiting of its scope, for construction of digital representation of complex compositional fluids describing their thermodynamics may admit to other equally effective embodiments.

DETAILED DESCRIPTION

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

The term fluid, as used in this application, refers to a complex compositional fluid that, depending on pressure and temperature, can form one or more phases, i.e. gaseous or liquid. The fluid can be either natural or manufactured. A mixture of different fluids can also be referred to as fluid.

The term phase, as used in this application, refers to a homogeneous state of fluid having uniform properties inside of a certain spatial region. Depending on the physical nature of the considered problem, the term phase can also refer to an effective phase, which has uniform properties on an appropriately larger scale. For example, in many cases microemulsion can be considered an effective phase.

The term digital rock model, as used in this application, refers to pore and grain level models of a porous medium. The resolution of these models is typically in the range of a few microns or less. The digital rock model is generated based on a 3D porous solid image of a core sample. A 3D porous solid image is a 3D digital representation of the core sample that is generated using computed tomography (X-ray, NMR, or other), scanning electron microscopy, focused ion beam scanning electron microscopy, confocal microscopy, or other suitable scanning means. Specifically, the 3D porous solid image is an image of each portion of the core sample including pores and solid surfaces. Thus, the 3D porous solid image may show pores and rock boundaries of the core sample for each layer of the core sample. While the 3D porous solid image may show the physical structure of the core sample, the digital rock model may include the lithology of the core sample. For example, the lithographic properties of the core sample may include pore size distribution, rock type, and tortuosity measurements. Fluid flow processes may be simulated in a digital rock model using various techniques. These flow processes are related to: a) subterranean fluids that are native to a rock formation, b) fluids, either natural or manufactured, injected into the rock formation from an external source, or c) a combination of the native and the external fluids (natural or/and manufactured).

The term core sample, as used in this application, refers to a 3D porous medium representing a portion of the oilfield, or a manufactured porous sample. In particular, a core sample refers to a physical sample obtained from a portion of the oilfield or artificially manufactured. For example, the core sample may be obtained by drilling into the portion of the oilfield with a core drill to extract the core sample from the portion. The core sample may contain subterranean fluids, such as multiphase compositional fluids.

The term equation of state, as used in this application, refers to a thermodynamic equation describing the state of the fluids under a given set of physical conditions. The equation of state is a constitutive equation which provides a mathematical relationship between two or more state functions associated with the fluids. For example, the state functions may include temperature, pressure, volume, or internal energy.

The term Helmholtz free energy, as used in this application, refers to a thermodynamic potential that measures the useful work obtainable from a closed thermodynamic system at a constant temperature. Similar definition is given by, for example, H. B. Callen, *Thermodynamics and an introduction to thermostatics,* 2nd edition, John Wiley & Sons, New York, 1985; or Bazarov I., *Thermodynamics,* Oxford: Pergamon Press, 1964. For example, the closed thermodynamic system may be the core sample and the fluids contained in the core sample. The Helmholtz free energy model refers to a mathematical model of the natural or manufactured compositional fluids based on the Helmholtz free energy. Helmholtz free energy contains information describing equilibrium properties of the fluid.

One or more aspects of construction of a digital representation of complex compositional fluids describing their thermodynamics provide a method of laboratory fluid characterization to construct comprehensive fluid formulation for the fluid under study (e.g., the subterranean fluids extracted from a core sample). The constructed fluid formulation is referred to as the fluid description and may be used in digital rock modeling, multiphase flow simulations, fluid analysis, reservoir simulation, etc. In one or more embodiments, the fluid description is based on Helmholtz energy approach and is applied within the framework of the density functional (DF) method for complex pore-scale hydrodynamics. In one or more embodiments, this fluid description is used to represent chemical and thermodynamic behavior of formation fluids, enhanced oil recovery (EOR) fluids, and improved oil recovery (IOR) fluids in a consistent way.

In order to perform mathematical modeling of fluid flow processes, tabulated functions or analytical expressions that are dependent on local temperature and local molar densities may be used for calculating the following quantities at arbitrary fluid compositions: bulk Helmholtz energy density, volume and shear viscosity (or other rheological properties including effects such as elongation viscosity and viscoelasticity), thermal and diffusion transport coefficients, surface tension between fluid and rock, and between different fluids, adsorption at fluid-rock and fluid-fluid interfaces, etc. For these quantities, experimental values or experimentally validated correlations in respect to temperature and molar densities are used in one or more embodiments. In order to obtain material parameters experimentally, standard and well-established laboratory methods are used such as mass density obtained by buoyancy or acoustic principles; shear viscosity being obtained from the drag force of a fluid moving past a surface also dependent on shear rate (shear rheology); advanced rheological characterization of non-Newtonian reservoir and EOR fluids (e.g., may be done by means of rotary viscometers, core flooding, measurements of adsorption, flooding within channels of controlled geometry); pendant drop tensiometers and drop shape analysis can be used to determine the interfacial tension and contact angle between fluid/fluid and fluid/fluid/solid.

Figure 1:
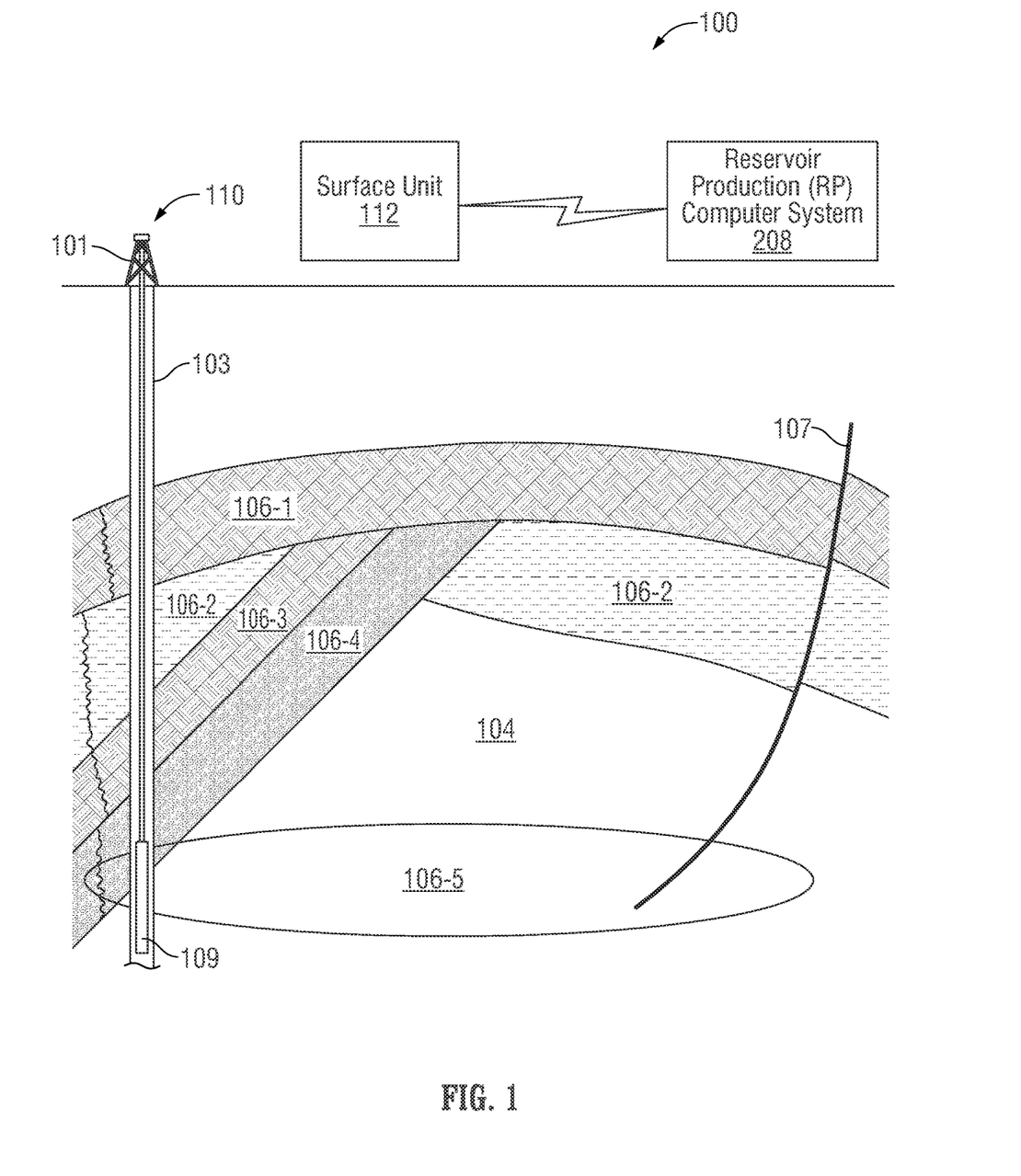
FIG. 1 is a schematic view, partially in cross-section, of a field in which one or more embodiments of construction of digital representation of complex compositional fluids describing their thermodynamics may be implemented.

FIG. 1 depicts a schematic view, partially in cross section, of a field 100 in which one or more embodiments of a digital representation of complex compositional fluids may be implemented. In one or more embodiments, one or more of the modules and elements shown in FIG. 1 may be omitted, repeated, and/or substituted. Accordingly, embodiments of a digital representation of complex compositional fluids should not be considered limited to the specific arrangements of modules shown in FIG. 1.

As shown in FIG. 1, the subterranean formation 104 includes several geological structures (106-1 through 106-4). As shown, the formation includes a sandstone layer 106-1, a limestone layer 106-2, a shale layer 106-3, and a sand layer 106-4. A fault line 107 extends through the formation. One or more of the geological structures (106-1 through 106-4) may be part of a reservoir (e.g., reservoir 106-5) of subterranean fluids. In one or more embodiments, various survey tools and/or data acquisition tools (e.g., data acquisition tool 109) are adapted to measure the formation and detect the characteristics of the geological structures of the formation and/or subterranean fluids contained in the geological structures.

Further, as shown in FIG. 1, the wellsite system 110 is associated with a rig 101, a wellbore 103, and other wellsite equipment and is configured to perform wellbore operations, such as logging, drilling, fracturing, production, or other applicable operations. Generally, survey operations and wellbore operations are referred to as field operations of the field 100. These field operations may be performed as directed by the surface unit 112.

In one or more embodiments, the surface unit 112 is operatively coupled to a reservoir production (RP) computer system 208 and/or the wellsite system 110. In particular, the surface unit 112 is configured to communicate with the RP computer system 208 and/or the wellsite system 110 to send commands to the RP computer system 208 and/or the wellsite system 110 and to receive data therefrom. For example, the wellsite system 110 may be adapted for measuring downhole properties using logging-while-drilling (LWD) tools and for obtaining core samples. In one or more embodiments, the surface unit 112 may be located at the wellsite system 110 and/or remote locations. The surface unit 112 may be provided with computer facilities for receiving, storing, processing, and/or analyzing data from the RP computer system 208, the wellsite system 110, or other part of the field 100. The surface unit 112 may also be provided with functionality for actuating mechanisms at the field 100. The surface unit 112 may then send command signals to the field 100 in response to data received, for example to control and/or optimize various field operations described above.

In one or more embodiments, the data received by the surface unit 112 represents characteristics of the subterranean formation 104 and may include seismic data and/or information related to porosity, saturation, permeability, natural fractures, stress magnitude and orientations, elastic properties, etc. during a drilling, fracturing, logging, or production operation of the wellbore 103 at the wellsite system 110.

In one or more embodiments, the surface unit 112 is communicatively coupled to the RP computer system 208. Generally, the RP computer system 208 is configured to analyze, model, control, optimize, or perform other management tasks of the aforementioned field operations based on the data provided from the surface unit 112. Although the surface unit 112 is shown as separate from the RP computer system 208 in FIG. 1, in other examples, the surface unit 112 and the RP computer system 208 may also be combined.

While a specific subterranean formation 104 with specific geological structures is described above, it will be appreciated that the formation may contain a variety of geological structures. Fluid, rock, water, oil, gas, and other geomaterials may also be present in various portions of the formation 104. Further, one or more types of measurement may be taken at one or more locations across one or more fields or other locations for comparison and/or analysis using one or more acquisition tools.

Although many wells (e.g., hundreds of wells) are typically present in a field, only a single well with a single well log is explicitly shown in the field 100 for clarity of illustration.

Figure 2:
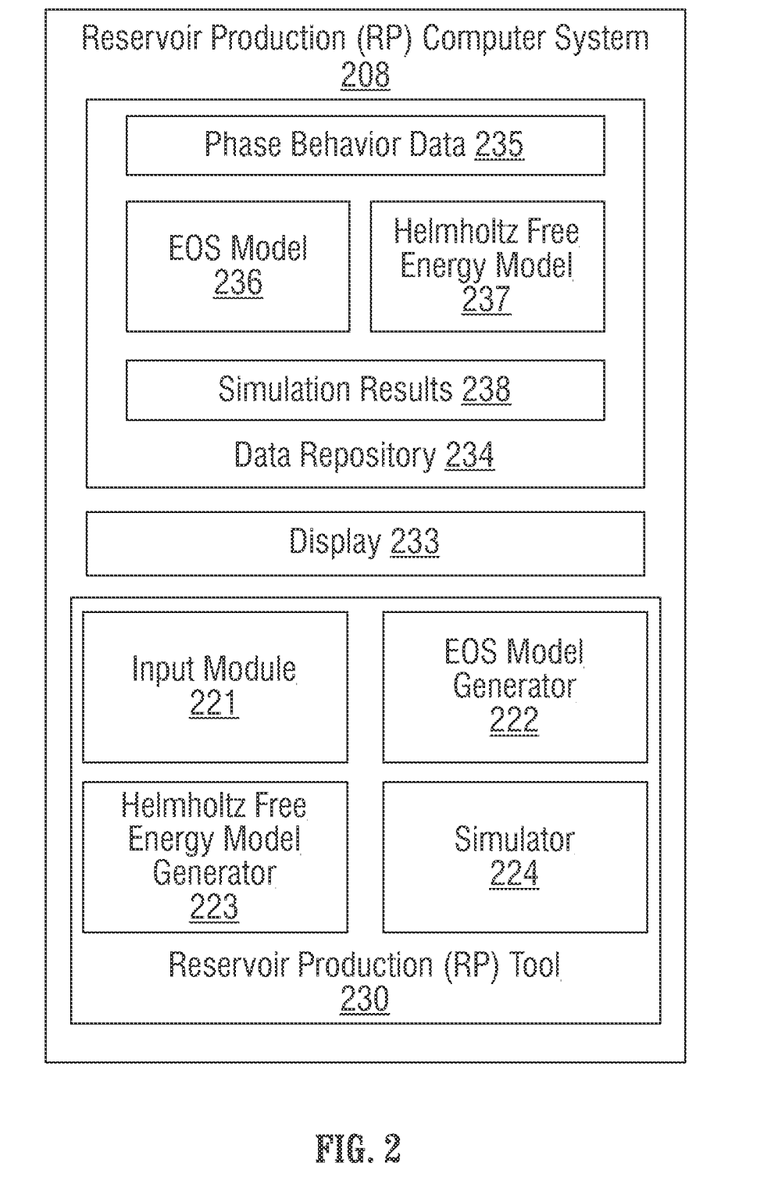
FIG. 2 shows a reservoir production computer system in accordance with one or more embodiments.

FIG. 2 shows more details of the RP computer system 208 in which one or more embodiments of construction of digital representation of complex compositional fluids describing their thermodynamics may be implemented. In one or more embodiments, one or more of the modules and elements shown in FIG. 2 may be omitted, repeated, and/or substituted. Accordingly, embodiments of construction of digital representation of complex compositional fluids describing their thermodynamics should not be considered limited to the specific arrangements of modules shown in FIG. 2.

As shown in FIG. 2, the RP computer system 208 includes RP tool 230, data repository 234, and display 233. Each of these elements is described below.

In one or more embodiments, the RP computer system 208 includes the RP tool 230 having software instructions stored in a memory and executing on a processor to communicate with the surface unit 112 for receiving data (e.g., phase behavior data 235) therefrom and to manage (e.g., analyze, model, control, optimize, or perform other management tasks) the aforementioned field operations based on the received data. In one or more embodiments, the phase behavior data 235 is received by the input module 221 and stored in the data repository 234 to be processed by the RP tool 230.

One or more field operation management tasks (e.g., analysis task, modeling task, control task, optimization task, etc.) may be performed using the RP tool 230. In particular, the phase behavior data 235 are manipulated to generate, continuously or intermittently, preliminary and final results that are stored and displayed to the user. For example, the RP tool 230 may be used to perform Helmholtz free energy model generation, multiphase flow simulation, fluid analysis, reservoir simulation, etc. where the EOS model generator 222, Helmholtz free energy model generator 223, and/or simulator 224 process the phase behavior data 235 to generate the EOS model 236, Helmholtz free energy model 237, and/or simulation results 238, that are selectively displayed to the user using the display 233. In one or more embodiments, the display 233 may be a two-dimensional (2D) display, a 3D display, or other suitable display device. The processor and memory of the RP computer system 208 are not explicitly depicted in FIG. 2 so as not to obscure other elements of the RP computer system 208. An example of such processor and memory is described in reference to FIG. 4 below.

In one or more embodiments, the RP tool 230 includes the input module 221 that is configured to obtain the phase behavior data 235 of subterranean fluids extracted from a core sample obtained in a portion of the field 104 shown in FIG. 1 above. In particular, the phase behavior data 235 represents measured properties of the subterranean fluids. For example, the phase behavior data 235 may be obtained from laboratory fluid characterization based on the specific protocols complemented by the workflows for laboratory data processing. Laboratory fluid measurements may include different measurement techniques, laboratory equipment, and operating protocols to measure properties that include but are not limited with the following:

(i) Pressure/volume/temperature (PVT) behavior in a multiphase system, such as a two-phase compositional system (e.g., gas-oil system, oil-water-solvent system, etc.), a three-phase compositional system (e.g., gas-water-hydrate system, water-oil-microemulsion system, etc.), etc.;

(ii) Fluid-fluid and fluid-solid surface phenomena, such as interfacial tension (IFT), surfactants, adsorption, wetting angles, etc.;

(iii) Rheological properties, such as shear and volume viscosity, non-linear viscous effects, viscoelasticity, viscoelasticity, etc.

TABLE 1 lists example laboratory analyses that may be performed to generate these measured properties that are saved in the data repository 234 as the phase behavior data 235.

TABLE 1

Standard PVT Tests
    Composition, molecular weight, and density
    Multiple and single stage flash data (separator tests)

TABLE 1-continued

Density, compressibility, and viscosity measurements
    Constant composition expansion
    Differential liberation
    Constant volume depletion
Solvent/Gas Studies
    Swelling test (P-x Diagram)
    Single contact vapor-liquid equilibrium (VLE) experiments including phase compositions
    Forward and backward multi-contact experiments
    Slimtube, rising bubble or other developed miscibility tests
    Density, compressibility, and viscosity measurements
    Interfacial tension measurements
Chemical/Polymer Studies
    Surfactant/brine/oil phase behavior studies
    Interfacial tension measurements
    Rheological measurements
    Density and compressibility measurements In one or more embodiments, the phase behavior data 235 (e.g., laboratory data obtained from the laboratory analyses listed in TABLE 1) is used directly as input for the construction of the Helmholtz free energy model 237. In one or more embodiments, the phase behavior data 235 is used to tune appropriate correlations or the EOS model 236, which are then used to generate the input data for construction of the Helmholtz free energy model 237. In one or more embodiments, un-tuned correlations and/or un-tuned EOS model 236 are used to generate the input data for construction of the Helmholtz free energy model 237.

Components in the input data for the Helmholtz free energy models may be represented in several ways. Several, but not all, of these representations are described below.

In one or more embodiments, the fluids include well-defined chemical species, such as methane, water, carbon dioxide, etc. In such embodiments, known and/or measured properties (e.g., phase behavior data 235) of these well defined chemical species are used as input for the construction of the Helmholtz free energy model 237.

In one or more embodiments, the fluids include lumped pseudo components, such as $C_7+$ (oil components with normal boiling points greater than n-hexane), $C_{10}$-$C_{16}$ (oil components with normal boiling points between n-nonane and n-hexadecane), etc. In such embodiments, properties of these components (used as the input data for the Helmholtz free energy models) are calculated through a combination of correlations and mixing rules, and are tuned to laboratory measured data (i.e., phase behavior data 235).

In one or more embodiments, the fluids include process-specific pseudo components, such as the gas and oil components in a black oil model, the gas, light and heavy components in a ternary description of a gas injection process, etc. These components are defined through a specific process path. For example, the oil and gas for the black oil model components are defined through a differential liberation and separator test. In such embodiments, properties of these components (used as the input data for the Helmholtz free energy models) are generated from a tuned EOS model 236.

In one or more embodiments, the RP tool 230 includes the EOS model generator configured to generate thermodynamic and rheological models (e.g., the EOS model 236) of the fluids based on the phase behavior data 235. In one or more embodiments, the EOS model 236 is a true compositional model or a pseudo-compositional model similar to the ternary diagram known to those skilled in the art.

In one or more embodiments, the EOS model generator 222 is further configured to reduce the EOS model 236 to a reduced EOS model having a reduced number of components to represent the EOS model 236 over a pre-determined pressure and temperature range. For example, techniques known to those skilled in the art may be used to reduce the EOS model 236.

In one or more embodiments, the RP tool 230 includes the Helmholtz free energy model generator 223 that is configured to generate the Helmholtz free energy model 237 that reproduces predictions of the EOS model 236, or a reduced version of the EOS model 236, over a pre-determined temperature and pressure range.

The Helmholtz energy functional is able to cover all aspects of the equilibrium fluid behavior including the fluid thermodynamics (phase diagram, calorimetry) and chemical reactions. This helps to avoid splitting of the physical and chemical fluid behavior, as is currently done today in the PVT laboratory activity based on EOS fluid analysis and geochemical analysis. Helmholtz energy obtained directly from the conventional EOSs (with the use of the required additional information) is usually very complex mathematically (e.g., involves many rational expressions and logarithmic functions) and thus is not suitable for the numerical simulations. Further, the conventional EOS is required to be applicable for any molar volume or any molar density to uniquely reconstruct the Helmholtz energy. In other words, if the EOS describes the considered fluid only in a certain restricted range of molar volumes or molar densities, then the Helmholtz energy cannot be uniquely reconstructed.

In one or more embodiments, thermodynamic models of the fluid systems are then correlated to the suitable form of Helmholtz energy approximation around the relevant pressures and temperatures. In one or more embodiments, this approximation includes analytical rational expressions having coefficients that are adjusted automatically to the experimental points using curve fitting techniques, such as the geometrical approach.

In one or more embodiments, the Helmholtz free energy model 237 is constructed as a function of molar densities of chemical components and temperature of the fluids. For example, the Helmholtz free energy model 237 may be calculated as a sum of two terms, which are constructed separately.

In one or more embodiments, the first term of the Helmholtz free energy model 237 is calculated by the following steps:
 (a) The set of respective affine subspaces (tie-lines for 2-phase mixtures, 2D planes for 3-phase mixtures, etc.) is analytically parameterized by auxiliary parameters for multiphase states of the subterranean fluids.
 (b) The envelope of this set of affine subspaces is calculated. The result is the first Helmholtz energy term. The auxiliary parameters are eliminated at this step.

In one or more embodiments, the second term of the Helmholtz free energy model 237 is calculated by the following steps:
 (c) The respective nodal surfaces are approximated by analytic manifolds for multiphase states of the fluids.
 (d) The constitutive functions of these manifolds are used to construct the function, which has these manifolds as a minimum set. The result is the second Helmholtz energy term. The remaining free parameters are used for the fit of compressibility, heat capacity, etc.

In one or more embodiments, the RP tool 230 includes the simulator 224 that is configured to perform the simulation of the field 104 using the Helmholtz free energy model 237. For example, the simulation may include multiphase flow simulation, fluid analysis, reservoir simulation, etc. of the geological structures (106-1 through 106-4) and/or the reservoir 106-5 depicted in FIG. 1. In particular, the multiphase flow simulation may include 2-phase (e.g., oil-water, gas-water, gas-oil), 3-phase (e.g., oil-water-gas) immiscible, near-miscible, and miscible flow simulations, and the fluid analysis may include surface phase and thin film dynamics at multiphase flow, chemical EOR (e.g., polymer, solvent, surfactant lowering IFT and macroemulsion, microemulsion), low salinity flow analysis, etc.

As noted above, a field operation may then be performed based on the simulation result. For example, the simulation results may be used to predict downhole conditions, and make decisions concerning oilfield operations. Such decisions may involve well planning, well targeting, well completions, operating levels, production rates, and other operations and/or conditions. Often this information is used to determine when to drill new wells, re-complete existing wells, or alter wellbore production.

The data repository 234 may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository 234 may be a device internal to the RP computer system 208. Alternatively, the data repository 234 may be an external storage device operatively connected to the RP computer system 208.

In one or more embodiments, a method is provided for construction of a digital representation of complex compositional fluids for the description of their thermodynamics. The fluids include both subterranean fluids and fluids used in EOR processes. The method includes (i) obtaining phase behavior data of subterranean fluids of the field and fluids used in EOR processes, (ii) generating an EOS model of the fluids based on the phase behavior data, (iii) generating a Helmholtz free energy model that reproduces predictions of the EOS model, and (iv) performing the simulation of the field using the Helmholtz free energy model.

In one or more embodiments, a method is provided for construction of a digital representation of complex compositional fluids for the description of their thermodynamics. The method includes (i) obtaining phase behavior data of subterranean fluids of the field and fluids used in EOR processes, (ii) generating a Helmholtz free energy model using phase behavior data directly as input, and (iii) performing the simulation of the field using the Helmholtz free energy model.

Figure 3:
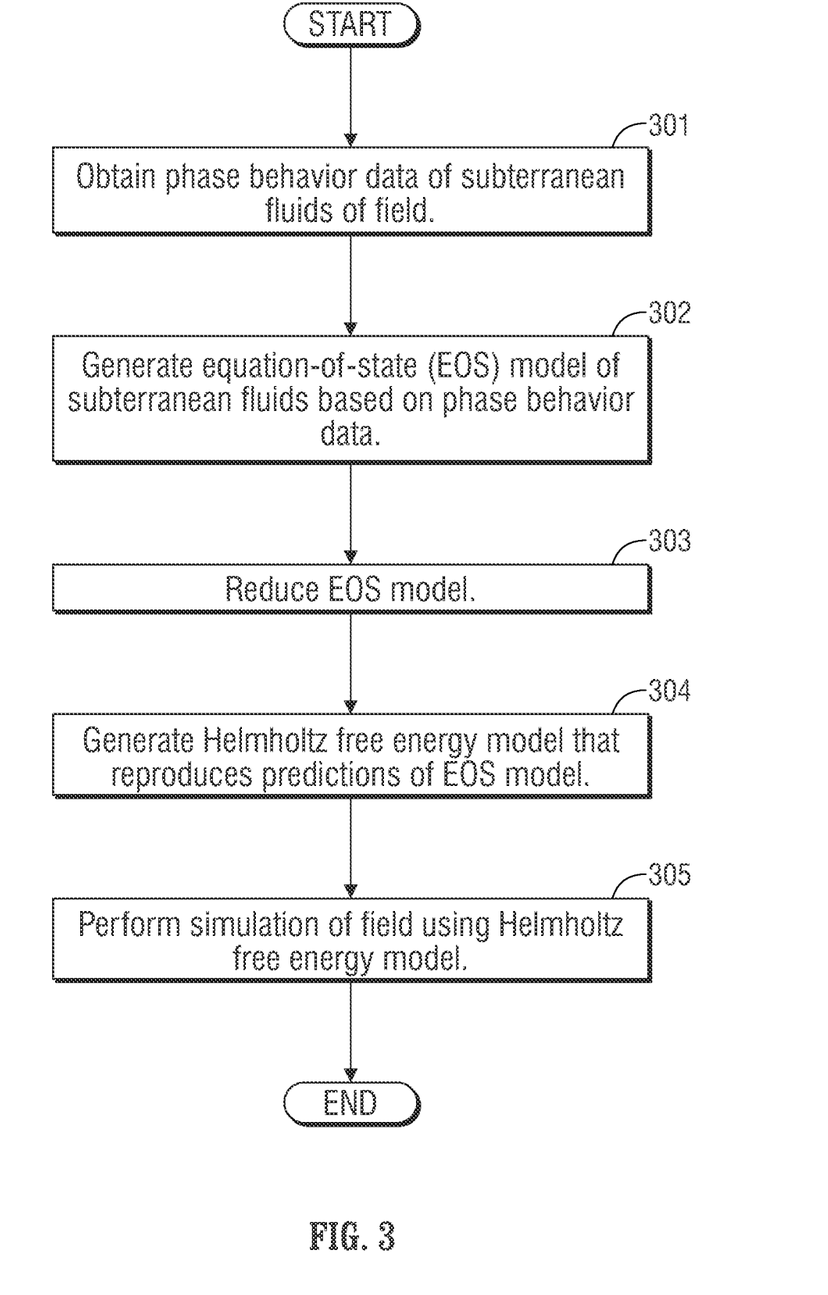
FIG. 3 shows a flowchart of a method in accordance with one or more embodiments.

FIG. 3 depicts an example method for construction of digital representation of complex compositional fluids describing their thermodynamics in accordance with one or more embodiments. For example, the method depicted in FIG. 3 may be practiced using the RP computer system 208 described in reference to FIGS. 1 and 2 above. In one or more embodiments, one or more of the elements shown in FIG. 3 may be omitted, repeated, and/or performed in a different order. Accordingly, embodiments of horizontal well log curve grids workflow should not be considered limited to the specific arrangements of elements shown in FIG. 3.

Initially in element 301, phase behavior data of subterranean fluids of the field are obtained. In one or more embodiments, the subterranean fluids are extracted from a core sample obtained in a portion of the field. In particular, the phase behavior data represent measured properties of the subterranean fluids and fluids used in EOR processes, which may be part of a multiphase compositional fluid system. For example, the phase behavior data may be obtained from laboratory fluid characterization based on the specific protocols complemented by the workflows for laboratory data processing. Examples of the phase behavior data are listed in TABLE 1.

In element 302, an EOS model of the fluids is generated based on the phase behavior data.

In element 303, the EOS model may be optionally reduced to a reduced EOS model having a reduced number of components to represent the EOS model over a pre-determined pressure and temperature range.

In element 304, a Helmholtz free energy model is generated that reproduces predictions of the EOS model (or reduced EOS model) over the aforementioned pre-determined pressure and temperature range.

In element 305, simulation of the field is performed using the Helmholtz free energy model. In one or more embodiments, the simulation is performed using the density functional hydrodynamic equations found in Demianov et al., "Density Functional Modelling in Multiphase Compositional Hydrodynamics", 89 Canadian Journal of Chemical Engineering, 206, 211-12, April 2011, Demianov et al., "Introduction to the density functional method in hydrodynamics", Fizmatlit, Moscow, 2014. ISBN 978-5-9221-1539-1., and D. Koroteev, et al., "Application of Digital Rock Technology for Chemical EOR Screening", SPE-165258, 2013.

Figure 4:
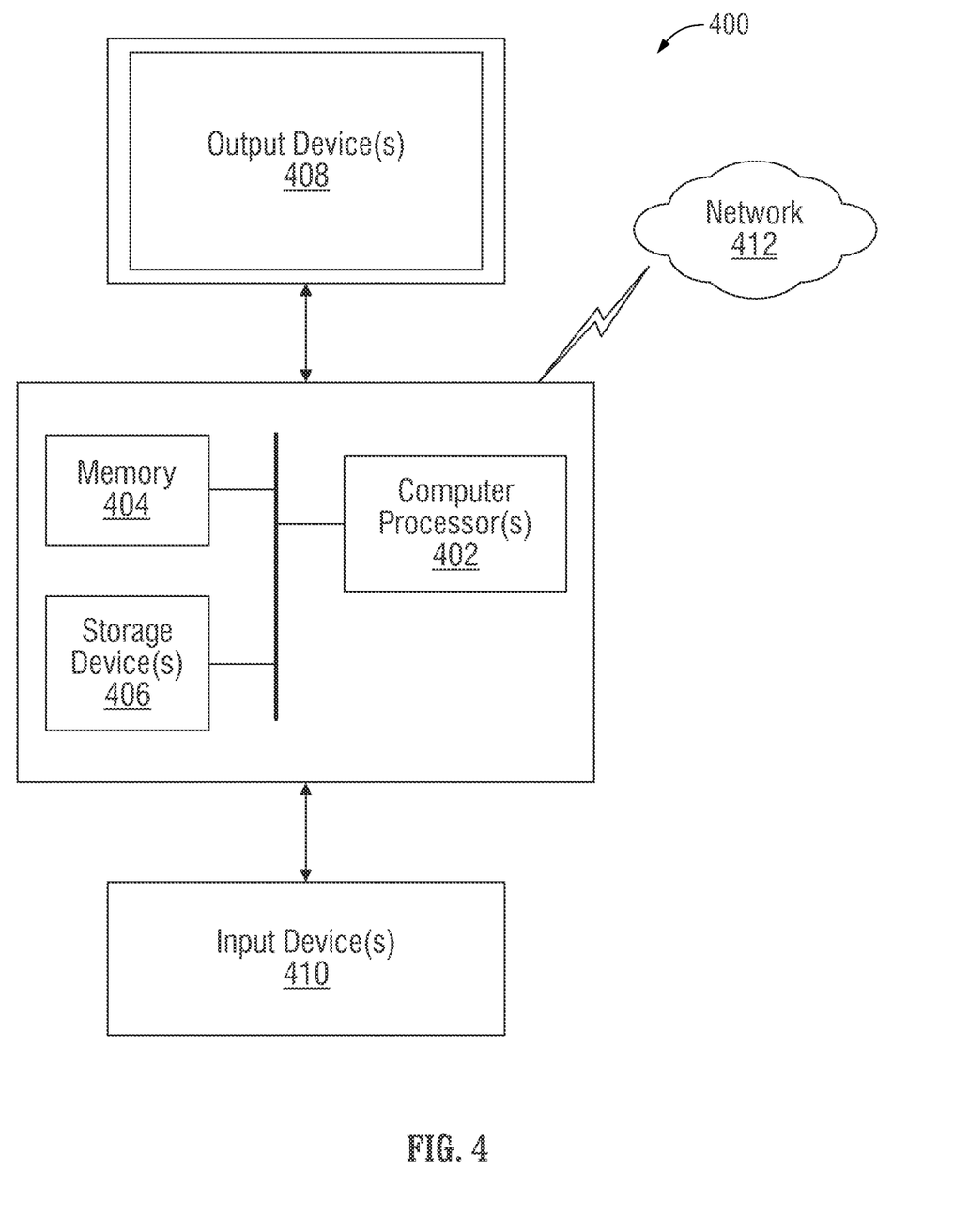
FIG. 4 depicts a computer system on which one or more embodiments of construction of digital representation of complex compositional fluids describing their thermodynamics may be implemented.

Embodiments of automated construction of Helmholtz free energy describing thermodynamics of complex compositional fluids may be implemented on virtually any type of computer regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of construction of a digital representation of complex 4, the computing system 400 may include one or more computer processor(s) 402, associated memory 404 (e.g., random access memory (RAM), cache memory, flash memory, etc.), one or more storage device(s) 406 (e.g., a hard disk, an optical drive such as a compact disk (CD) drive or digital versatile disk (DVD) drive, a flash memory stick, etc.), and numerous other elements and functionalities. The computer processor(s) 402 may be an integrated circuit for processing instructions. For example, the computer processor(s) may be one or more cores, or micro-cores of a processor. The computing system 400 may also include one or more input device(s) 410, such as a touchscreen, keyboard, mouse, microphone, touchpad, electronic pen, or any other type of input device. Further, the computing system 400 may include one or more output device(s) 408, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system 400 may be connected to a network 412 (e.g., a local area network (LAN), a wide area network (WAN) such as the Internet, mobile network, or any other type of network) via a network interface connection. The input and output device(s) may be locally or remotely (e.g., via the network 412) connected to the computer processor(s) 402, memory 404, and storage device(s) 406. Many different types of computing systems exist, and the aforementioned input and output device(s) may take other forms.

Software instructions in the form of computer readable program code to perform embodiments of construction of digital representation of complex compositional fluids describing their thermodynamics may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by computer processor(s), is configured to perform embodiments of a workflow that constructs a digital representation of complex compositional fluids.

Further, one or more elements of the aforementioned computing system 400 may be located at a remote location and connected to the other elements over a network 412. Further, embodiments of construction of a digital representation of complex compositional fluids describing their thermodynamics may be implemented on a distributed system having a plurality of nodes, where each portion of workflow that constructs a digital representation of complex compositional fluids may be located on a different node within the distributed system. In one embodiment of construction of a digital representation of complex compositional fluids describing their thermodynamics, the node corresponds to a distinct computing device. The node may correspond to a computer processor with associated physical memory. The node may correspond to a computer processor or micro-core of a computer processor with shared memory and/or resources.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While construction of a digital representation of complex compositional fluids describing their thermodynamics has been described with respect to a limited number of embodiments, those skilled in the art, having benefit of this disclosure, will appreciate that other embodiments can be devised which do not depart from the scope of construction of a digital representation of complex compositional fluids describing their thermodynamics as disclosed herein. Accordingly, the scope of construction of a digital representation of complex compositional fluids describing their thermodynamics should be limited only by the attached claims.

What is claimed is:

1. A method for improving hydrocarbon recovery by performing a simulation of a field having a subterranean formation, comprising:
   obtaining phase behavior data of subterranean fluids of the field;
   generating an equation of state (EOS) model of the fluids based on the phase behavior data;
   generating, by a processor of a computer system, a Helmholtz free energy model that reproduces predictions of the EOS model over a pre-determined pressure and temperature range;
   performing, by the processor, the simulation of the field using the Helmholtz free energy model; and performing or modifying a field operation based on the simulation results, wherein the field operation is well planning, well targeting, well completion, operating levels, or production rates.

2. The method of claim 1, wherein the subterranean fluids comprise injection fluids.

3. The method of claim 1, further comprising:
reducing the EOS model to a reduced EOS model having a reduced number of components to represent the EOS model over a pre-determined pressure and temperature range, and
wherein the Helmholtz free energy model is generated based on the reduced EOS model.

4. The method of claim 1, wherein the phase behavior data represents at least one property of the fluids selected from a group consisting of pressure, volume, temperature, fluid-fluid interface phenomenon, fluid-solid interface phenomenon, and rheological property.

5. The method of claim 4, wherein the fluids comprise a multiphase compositional fluid system.

6. A computer system comprising:
a processor and memory; and
a reservoir production (RP) tool stored in the memory, executing on the processor, and comprising:
an input module configured to obtain phase behavior data of fluids;
an equation of state (EOS) model generator configured to generate an EOS model of the fluids based on the phase behavior data;
a free energy model generator configured to generate a Helmholtz free energy model that reproduces predictions of the EOS model over a predetermined temperature and pressure range; and a simulator configured to perform simulation of the field using the Helmholtz free energy model; and
a repository configured to store the phase behavior data, the EOS model, and the Helmholtz free energy model
wherein the processor further configured to perform or modify a field operation based on the simulation result, wherein the field operation is well planning, well targeting, well completion, operating levels, or production rates.

7. The system of claim 6, the EOS model generator further configured to:
reduce the EOS model to a reduced EOS model having a reduced number of components to represent the EOS model over a pre-determined pressure and temperature range, and
wherein the Helmholtz free energy model is generated based on the reduced EOS model.

8. The system of claim 6, wherein the phase behavior data represents at least one property of the fluids selected from a group consisting of pressure, volume, temperature, fluid-fluid interface phenomenon, fluid-solid interface phenomenon, and rheological property.

9. The system of claim 6, wherein the fluids comprise a multiphase compositional fluid system.

10. A non-transitory computer-readable medium comprising instructions for improving hydrocarbon recovery by performing a simulation of a field having a subterranean formation, the instructions when executed by a computer processor comprising functionality for:
obtaining phase behavior data of subterranean fluids of the field;
obtaining phase behavior data of injection fluids used in the field;
generating an equation of state (EOS) model of the subterranean and injection fluids based on the phase behavior data;
generating a Helmholtz free energy model that reproduces predictions of the EOS model over a pre-determined pressure and temperature range;
performing the simulation of the field using the Helmholtz free energy model; and
performing or modifying a field operation based on the simulation result, wherein the field operation is well planning, well targeting, well completion, operating levels, or production rates.

11. The non-transitory computer readable medium of claim 10, the instructions when executed by the computer processor further comprising functionality for:
reducing the EOS model to a reduced EOS model having a reduced number of components to represent the EOS model over a pre-determined pressure and temperature range, and
wherein the Helmholtz free energy model is generated based on the reduced EOS model.

12. The non-transitory computer readable medium of claim 10, wherein the phase behavior data of the subterranean and injection fluids represents at least one property of the fluids selected from a group consisting of pressure, volume, temperature, fluid-fluid interface phenomenon, fluid-solid interface phenomenon, and rheological property.

13. The non-transitory computer readable medium of claim 10, wherein the subterranean and injection fluids comprise a multiphase compositional fluid system.

14. A method for improving hydrocarbon recovery by performing a simulation of a field having a subterranean formation, comprising:
obtaining phase behavior data of subterranean fluids of the field;
obtaining phase behavior data of injection fluids used in the field;
generating, by a processor of a computer system, a Helmholtz free energy model that reproduces the phase behavior data of the fluids of the field over a predetermined pressure and temperature range;
performing, by the processor, the simulation of the field using the Helmholtz free energy model; and
performing or modifying a field operation based on the simulation result, wherein the field operation is well planning, well targeting, well completion, operating levels, or production rates.

15. The method of claim 14, further comprising:
deriving an equation of state (EOS) model of the subterranean and injection fluids based on the Helmholtz free energy model.

16. The method of claim 14, wherein the phase behavior data of the subterranean and injection fluids represents at least one property of the fluids selected from a group consisting of pressure, volume, temperature, fluid-fluid interface phenomenon, fluid-solid interface phenomenon, and rheological property.

17. The method of claim 14, wherein the subterranean and injection fluids comprise a multiphase compositional fluid system.

18. A computer system comprising:
a processor and memory; and
a reservoir production (RP) tool stored in the memory, executing on the processor, and comprising:
an input module configured to obtain phase behavior data of subterranean fluids of a field;

an input module configured to obtain phase behavior data of injection fluids used in the field;

a free energy model generator configured to generate a Helmholtz free energy model that reproduces the phase behavior data of the subterranean and injection fluids over a pre-determined pressure and temperature range; and a simulator configured to perform a simulation of the field using the Helmholtz free energy model; and a repository configured to store the phase behavior data and the Helmholtz free energy model;

wherein the processor further configured to perform or modify a field operation based on the simulation result, wherein the field operation is well planning, well targeting, well completion, operating levels, or production rates.

19. The system of claim 18, wherein the phase behavior data of the subterranean and injection fluids represents at least one property of the fluids selected from a group consisting of pressure, volume, temperature, fluid-fluid interface phenomenon, fluid-solid interface phenomenon, and rheological property.

20. The system of claim 18, wherein the subterranean and injection fluids comprise a multiphase compositional fluid system.

21. A non-transitory computer readable medium comprising instructions for performing a simulation of a field having a subterranean formation, the instructions when executed by a computer processor comprising functionality for:

obtaining phase behavior data of subterranean fluids of the field;

obtaining phase behavior data of injection fluids used in the field;

generating a Helmholtz free energy model that reproduces the phase behavior data of the subterranean and injection fluids over a pre-determined pressure and temperature range; performing the simulation of the field using the Helmholtz free energy model; and performing or modifying a field operation based on the simulation result, wherein the field operation is well planning, well targeting, well completion, operating levels, or production rates.

22. The non-transitory computer readable medium of claim 21, wherein the phase behavior data of the subterranean and injection fluids represents at least one property of the fluids selected from a group consisting of pressure, volume, temperature, fluid-fluid interface phenomenon, fluid-solid interface phenomenon, and rheological property.

23. The non-transitory computer readable medium of claim 21, wherein the subterranean and injection fluids comprise a multiphase compositional fluid system.

* * * * *